US011898723B2

(12) United States Patent
Zeitler et al.

(10) Patent No.: US 11,898,723 B2

(45) Date of Patent: *Feb. 13, 2024

(54) POLE MOUNTED TORCH ASSEMBLY

(71) Applicant: Lamplight Farms Incorporated, Menomonee Falls, WI (US)

(72) Inventors: Lucas Henry Zeitler, Wauwatosa, WI (US); Robert Woodruff, Oconomowoc, WI (US); David A. Reed, Hartford, WI (US)

(73) Assignee: Lamplight Farms Inc orporated, Menomonee Falls, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/893,106

(22) Filed: Aug. 22, 2022

(65) Prior Publication Data

US 2022/0403992 A1 Dec. 22, 2022

Related U.S. Application Data

(63) Continuation-in-part of application No. 17/131,144, filed on Dec. 22, 2020, now Pat. No. 11,421,836.

(51) Int. Cl.

| | |
|---|---|
| ***F21S 8/08*** | (2006.01) |
| ***F21V 37/00*** | (2006.01) |
| ***F21W 131/109*** | (2006.01) |

(52) U.S. Cl.

CPC .............. *F21S 8/08* (2013.01); *F21V 37/002* (2013.01); *F21V 37/0008* (2013.01); *F21W 2131/109* (2013.01)

(58) Field of Classification Search

CPC .................. F21L 17/00; F23D 3/24–26; F23D 2206/0057–0089; F23D 14/00–84; F21V 37/0016; F21S 8/08–081; F21S 15/00; A01M 29/12; A01M 29/14

See application file for complete search history.

(56) References Cited

U.S. PATENT DOCUMENTS

| | | | | |
|---|---|---|---|---|
| 8,708,515 B2 * | 4/2014 | White | ..................... | F21S 19/00 431/321 |
| 11,421,836 B2 * | 8/2022 | Zeitler | .................. | F21V 17/002 |
| 2019/0281810 A1 * | 9/2019 | Sinur | .................... | A01M 29/12 |

* cited by examiner

*Primary Examiner* — Mariceli Santiago

(74) *Attorney, Agent, or Firm* — GableGotwals; David G. Woodral

(57) ABSTRACT

A support pole is received in a pole receiver. The pole has an outwardly biased spring tab that is compressible by an inside surface of the pole receiver until the spring tab is inserted to a location above a top surface of the pole receiver, thereby creating a secure attachment of the torch assembly to the pole.

12 Claims, 12 Drawing Sheets

SECTION A-A

POLE MOUNTED TORCH ASSEMBLY

CROSS-REFERENCE TO RELATED CASES

This application is a continuation-in-part of U.S. patent application Ser. No. 17/131,144 entitled POLE MOUNTED TORCH ASSEMBLY filed on Dec. 22, 2020, the contents of which are hereby incorporated by reference.

FIELD OF THE INVENTION

The present disclosure relates to a torch assembly. More particularly, the present disclosure relates to an improved mechanism for affixing a torch assembly to a support pole.

BACKGROUND OF THE INVENTION

Patio torches, also known as lawn torches or garden torches, may be used to provide lighting or decoration. Sometimes, scented oils or insect repellent oils are burned in the patio torches for additional effect. A torch may include a refillable canister that accepts liquid fuel.

Typically, patio torches are mounted on a pole. It is desirable to provide an inexpensive and reliable design for securing a patio torch to an upper end of a mounting pole.

SUMMARY OF THE INVENTION

A torch assembly and support pole combination is described herein. The torch assembly includes a can assembly. The can assembly has a can body having top surface and a bottom surface. A can body top is received the top surface and a can body bottom is received on the bottom surface.

A flame guard is received on the can body top of the can body. The flame guard defines a wick orifice. The flame guard is preferably threadably received on the can body top.

A wick is received in the wick orifice of the flame guard. The wick has an upper end that extends above the flame guard and a lower end in contact with the can body bottom of the can assembly. A snuffer is removably received on the flame guard.

A sleeve surrounds the can assembly. A torch head surrounds the sleeve. The torch head has a bottom end that extends below the bottom surface of the can body.

A pole adapter tray is affixed to the bottom end of the torch head. The pole adapter tray has a tray portion that defines an upper surface and that defines a drain hole and a central hole. The pole adapter tray has a frusto-conical protrusion portion that extends above the upper surface of the tray portion. The frusto-conical protrusion portion defines an inside surface and a top surface. In one embodiment, the frusto-conical protrusion portion defines an internal taper having a 5 degree slope.

A support pole has an upper end that defines a taper. The support pole further defines a spring tab orifice adjacent the upper end. A spring tab protruding from the spring tab orifice. The spring tab is biased in an extended position, but may be pushed inwardly while the support pole is inserted into the frusto-conical protrusion portion of the pole adapter tray. Once the pole is fully inserted, i.e., when the spring tab emerges above the top surface of the frusto-conical protrusion, the spring tab creates a secure attachment of the torch assembly to the support pole.

More particularly, the torch and support pole combination of the present disclosure includes a torch assembly having a wick extending upwardly therefrom. In one embodiment, the torch assembly includes a can assembly having a bottom surface, a sleeve surrounding the can assembly and a torch head surrounding the sleeve. A pole adapter is affixed to the torch assembly. The pole adapter has a pole receiver that has an inside surface and a top surface. In one embodiment, the pole adapter defines a pole adapter tray that is affixed adjacent to a bottom end of the torch head and the pole receiver of the pole adapter protrudes above the pole adapter tray. In one embodiment, the pole receiver is a frusto-conical protrusion portion having a taper with a slope of between and 3 and 7 degrees. A support pole having an upper end is received in the pole receiver. In one embodiment, the support pole has an outwardly biased spring tab that is compressible by the inside surface of the pole receiver until the spring tab is inserted to a location above the top surface of the pole receiver, thereby creating a secure attachment of the torch assembly to the support pole. In one embodiment, the support pole defines a spring tab orifice, and the spring tab is an outwardly biased member that extends from the spring tab orifice. In another embodiment, the spring tab may be located on the pole receiver wherein the spring tab is biased inwardly for being received in an interlocking arrangement with an orifice or groove defined by the support pole.

In use, an upper end of the support pole is inserted into a pole receiver of a pole adapter that is affixed to the torch assembly. The outwardly biased spring tab on the support pole is compressed with an inside surface of the pole receiver. Alternatively, an inwardly biased spring tab on the pole receiver may be compressed by insertion of the support pole.

Compression of the spring tab is relieved when the spring tab is inserted to a location above a top surface of the pole receiver, thereby creating a secure attachment of the torch assembly to the support pole.

DETAILED DESCRIPTION OF THE PREFERRED EMBODIMENTS

Figure 4:
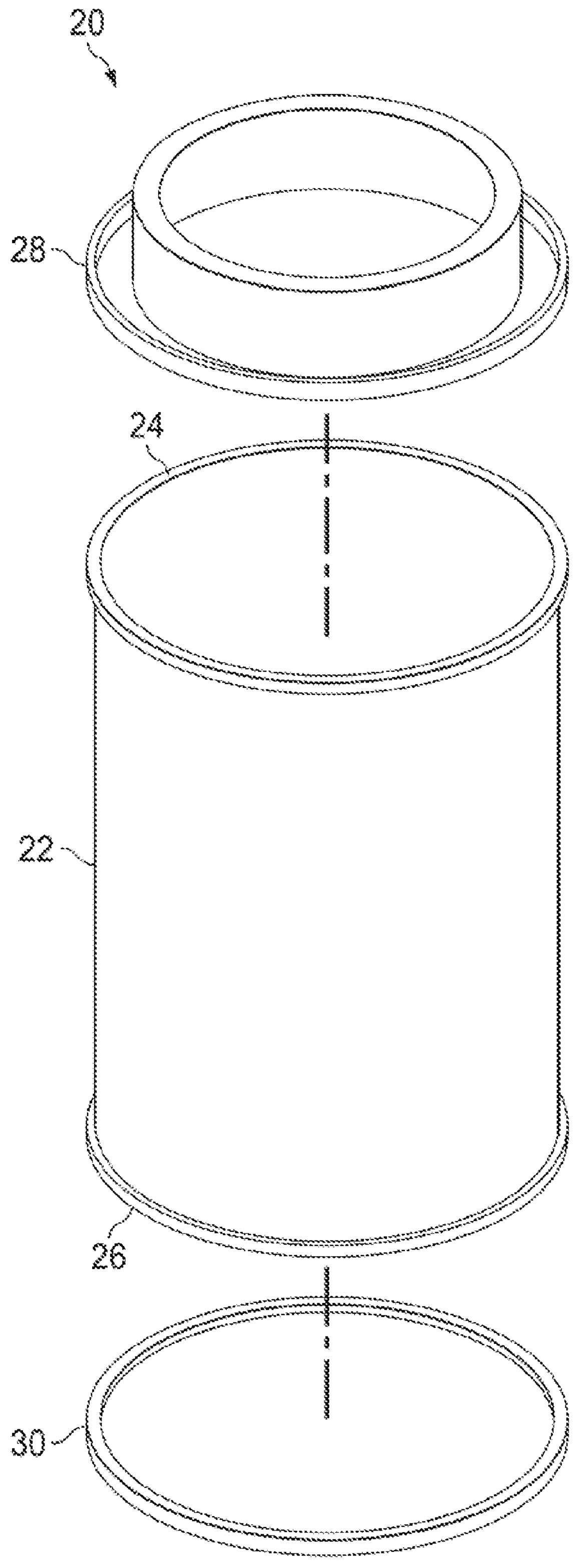
FIG. 4 is an exploded view of a can assembly of the torch assembly of FIG. 1.
Figure 5:
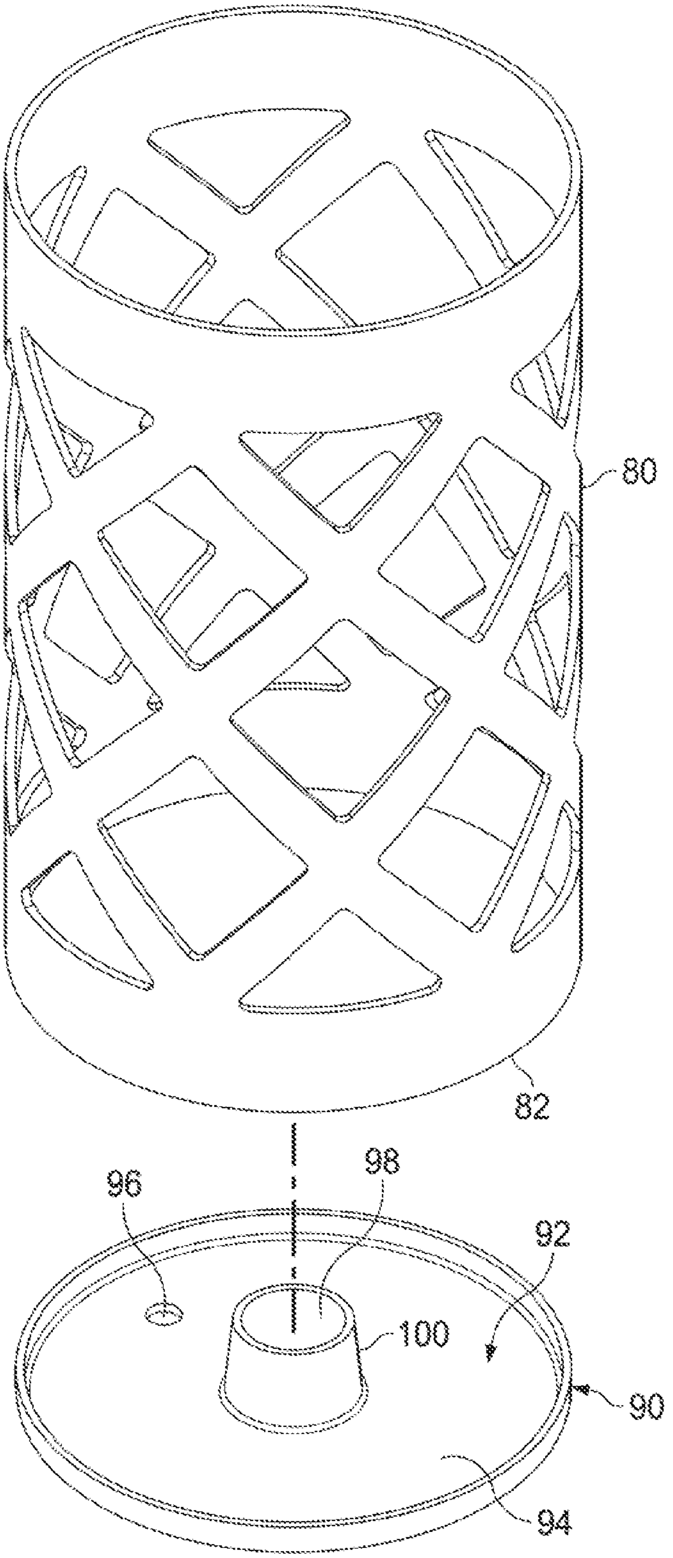
FIG. 5 is a perspective view of a torch head and pole adapter tray of the torch assembly of FIG. 1.
Figure 6:
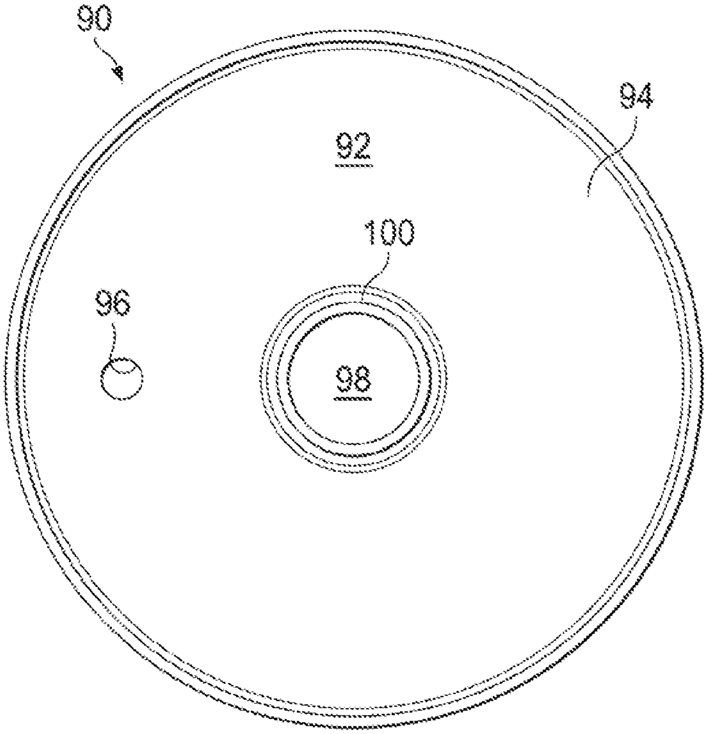
FIG. 6 is a plan view of the pole adapter tray of the torch assembly of FIG. 1.
Figure 7:
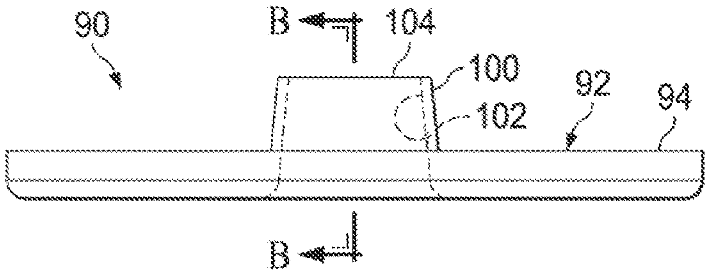
FIG. 7 is an elevation view of the pole adapter tray of the torch assembly of FIG. 1.

Referring now to the figures, shown is a torch assembly 10 of the present disclosure. Torch assembly 10 includes can assembly 20. Can assembly 20 includes a can body 22 having a top surface 24 and a bottom surface 26 (see, e.g., FIG. 4). Can body top 28 is received on top surface 24. Can body bottom 30 is received on bottom surface 26 of can assembly 20.

Flame guard 40 is preferably threadably received on can body top 28 of can body 22. Flame guard 40 defines wick orifice 42.

Wick 50 is received in wick orifice 42 of flame guard 40. Wick 50 has an upper end 52 extending above flame guard 40 and a lower end 54 that preferably makes contact with can body bottom 30 of can assembly 20.

Snuffer 60 is preferably removably received on flame guard 40.

Figure 2:
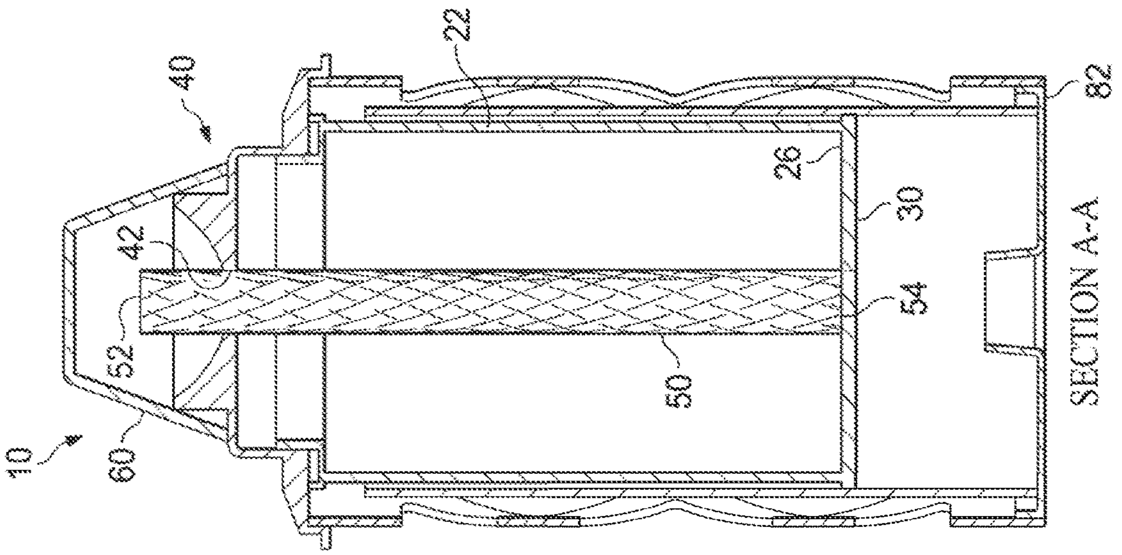
FIG. 2 is a cross sectional elevation view of the torch assembly of FIG. 1 taken along line A-A of FIG. 1.
Figure 1:
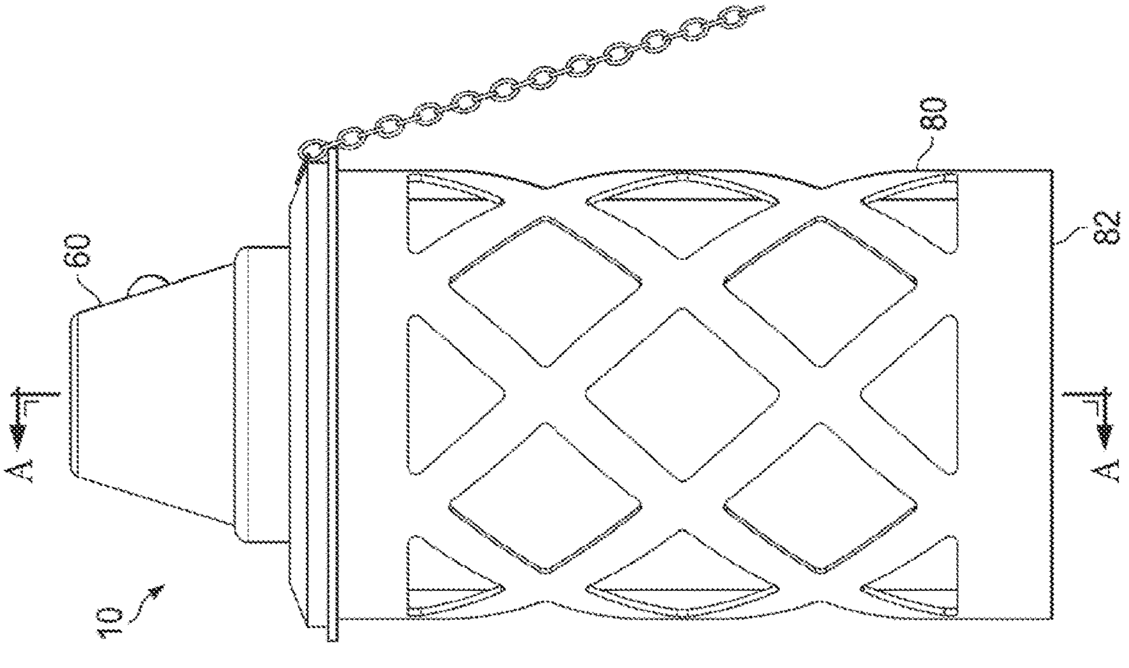
FIG. 1 is an elevation view of a torch assembly according to aspects of the present disclosure.
Figure 3:
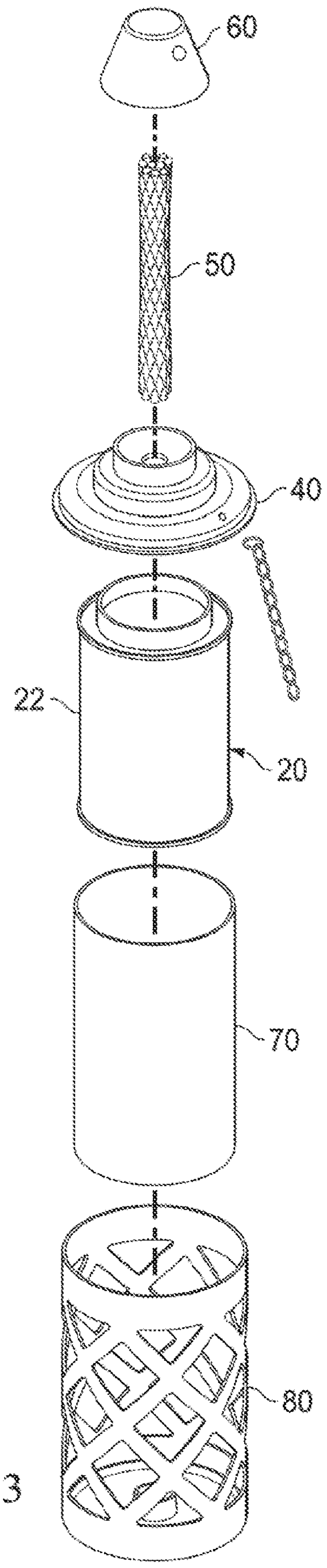
FIG. 3 is an exploded perspective view of the torch assembly of FIG. 1.

Sleeve 70 surrounds can assembly 20. Torch head 80 surrounds sleeve 70. Torch head 80 has bottom end 82 that extends below bottom surface 26 of can body 22 (see, e.g., FIG. 2).

Figure 8:
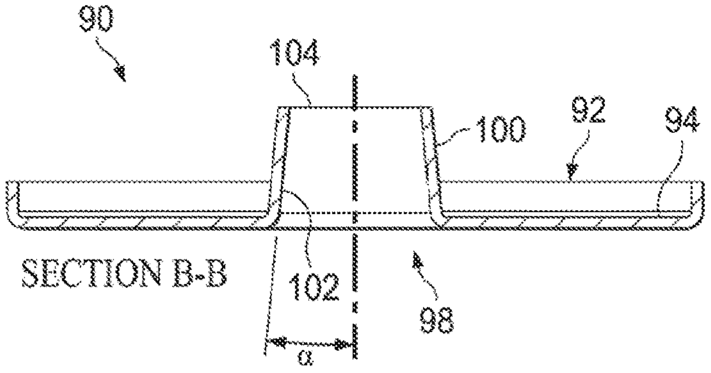
FIG. 8 is a cross sectional elevation view of the pole adapter tray of the torch assembly of FIG. 1.

Pole adapter tray 90 (best seen in FIGS. 5-8) is affixed to bottom end 82 of torch head 80. Pole adapter tray 90 has a tray portion 92. Tray portion 92 defines upper surface 94, drain hole 96, and central hole 98. Pole adapter tray 90 additionally has frusto-conical protrusion portion 100 that extends above upper surface 94 of tray portion 92. Protrusion portion 100 defines inside surface 102 and top surface 104. Protrusion portion 100 preferably has a taper. The taper of protrusion portion 100 may define a slope having an angle $\alpha$ (see, FIG. 8) of 1-10 degrees, more preferably 3 to 7 degrees, most preferably 5 degrees.

Figure 9:
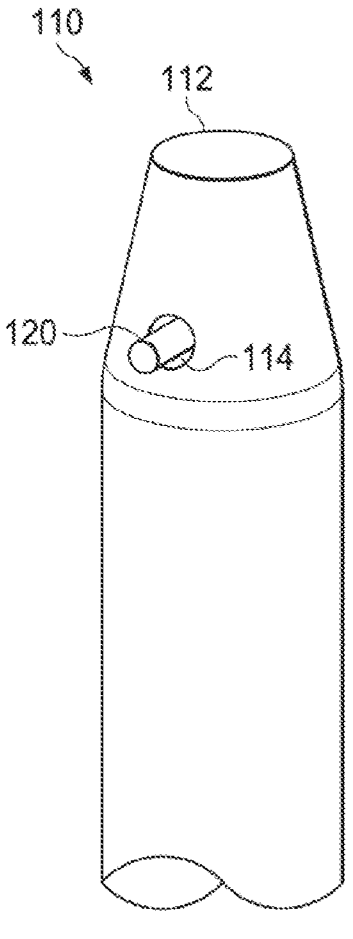
FIG. 9 is a perspective view of a support pole for supporting the torch assembly of FIG. 1.

Referring now to FIG. 9, support pole 110 has upper end 112. Upper end 112 preferably defines a taper. Support pole 110 defines spring tab orifice 114 adjacent upper end 112. A spring tab 120 protrudes from spring tab orifice 114.

In use, upper end 112 of support pole 110 may be received in protrusion portion 100 such that spring tab 120 is compressed by inside surface 102 of protrusion portion 100 until spring tab 120 is inserted to a location above top surface 104 of protrusion portion 100, whereupon spring tab 120 extends, thereby creating a secure attachment of torch assembly 10 to support pole 110.

Figure 10:
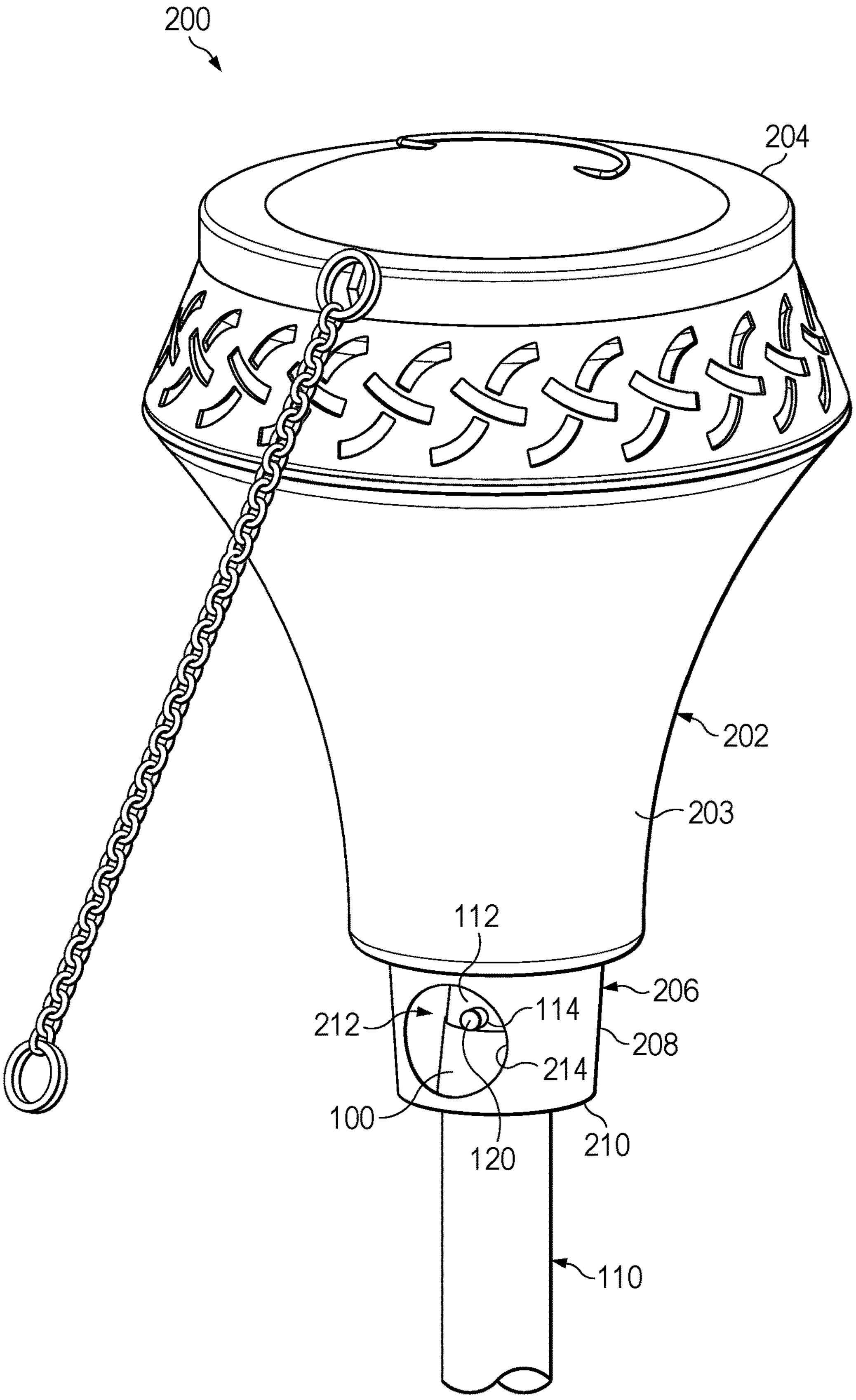
FIG. 10 a perspective view of a torch assembly according to aspects of the present disclosure.

Referring now to FIG. 10, a perspective view of a torch assembly 200 according to aspects of the present disclosure is shown. The torch assembly 200 may comprise a torch head assembly 202 that is attachable and detachable from a support pole 110 as described above. The torch head assembly 202 may attach to the support pole 110 via a connector 206. The connector 206 may have an outer wall 208 and a floor 210, as well as an interior cavity 212. A protrusion portion 100 as described above (including an over all frustoconical construction with a taper and top surface 104). The protrusion portion 100 may extend upwardly from the floor 210 and into the cavity 212.

In operation, the upper end 112 of the support pole 110 may be inserted into the protrusion portion 100 and into the cavity 212. The spring tab 120 may extend above the protrusion portion locking the torch head assembly 202 onto the support pole 110. The wall 208 may define an opening

214 sized to allow a user's finger to depress the spring tab 120 to remove the torch head assembly 202 from the support pole.

Figure 11:
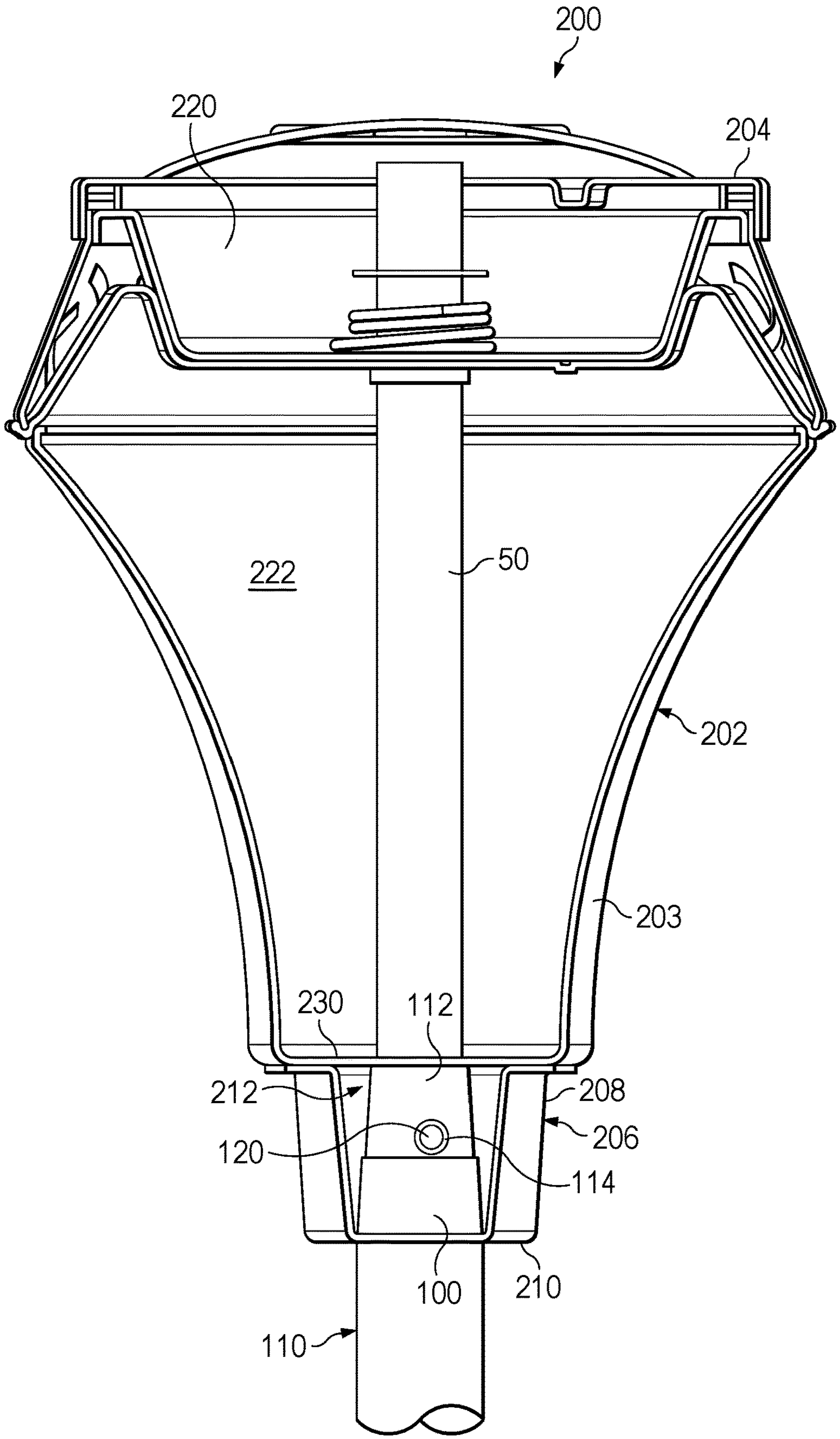
FIG. 11 is a partial cutaway view of the torch assembly of FIG. 10.

Referring now to FIG. 11, is a partial cutaway view of the torch assembly 200 of FIG. 10 is shown. The torch head assembly 202 may comprise a removable snuffer cap 204 selectively fitting over a large flame bowl 220 or other torch head. The large flame bowl surrounds a wick 50 and provides for production of large flame effects. In other embodiment, a non-large flame bowl, wick holder, or other torch head may be utilized. An outer wall 203 of the torch head assembly 202 may define an interior reservoir 222 for holding fuel, and into which the wick 50 extends from the flame bowl 220. A lower portion or floor 230 may be affixed, joined to, or integral with the wall 203 and provide a location for mounting the connector 206. The floor 230 may be circular with the wall 203 circumscribing the circular floor 230 where they connect. The flame bowl 220 and the connector 206 may be on opposite ends (e.g., upper and lower) of the torch head assembly 202 and/or of the wall 203.

In some embodiments, the connector 206 has a separate upper wall or ceiling joining to the floor 230, but in other embodiments the floor 230 limits or defines the interior cavity 212 when the connector is joined to the floor 230 (as shown). The connector 206 may be welded, fixed with adhesive, or formed integrally with the floor 230 of the torch head assembly 202.

Figure 12:
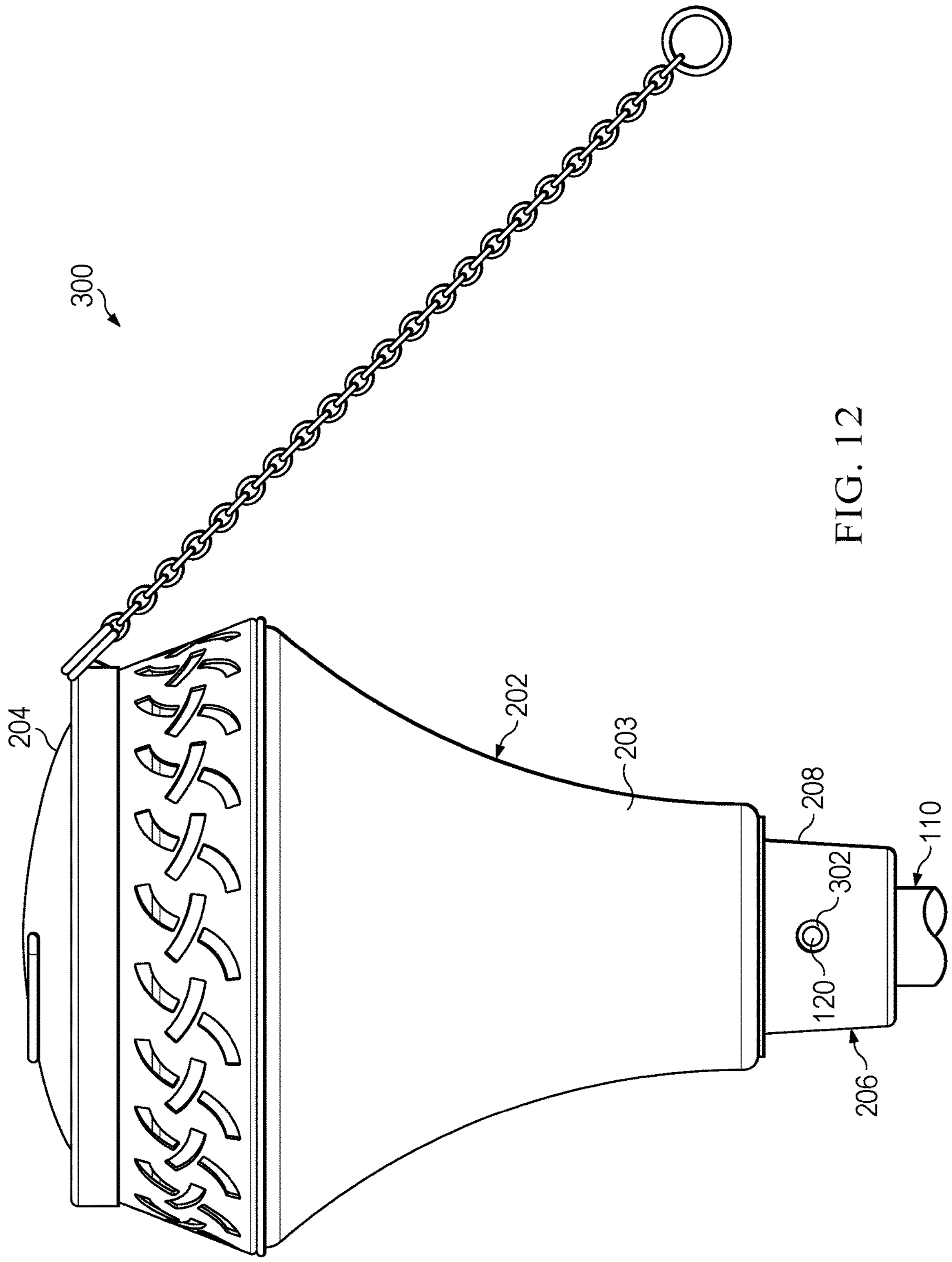
FIG. 12 is an elevation view of another torch assembly according to aspects of the present disclosure.

Referring now to FIG. 12, an elevation view of another torch assembly 300 according to aspects of the present disclosure is shown. The torch assembly 300 is substantially similar or identical to the torch head 200, including all internal components, except as explained herein. The connector 206, rather than providing a larger opening (e.g., 208, FIG. 10) in the wall 208, defines a smaller opening 302 allowing access to the spring tab 120 of the support pole 110. The opening 302 may be sized to allow a tool such as a punch or a screwdriver to depress the spring tab 120 for separation of the torch head assembly 202 from the support pole 110. In other embodiments, a purpose-built tool may be used.

Figure 13:
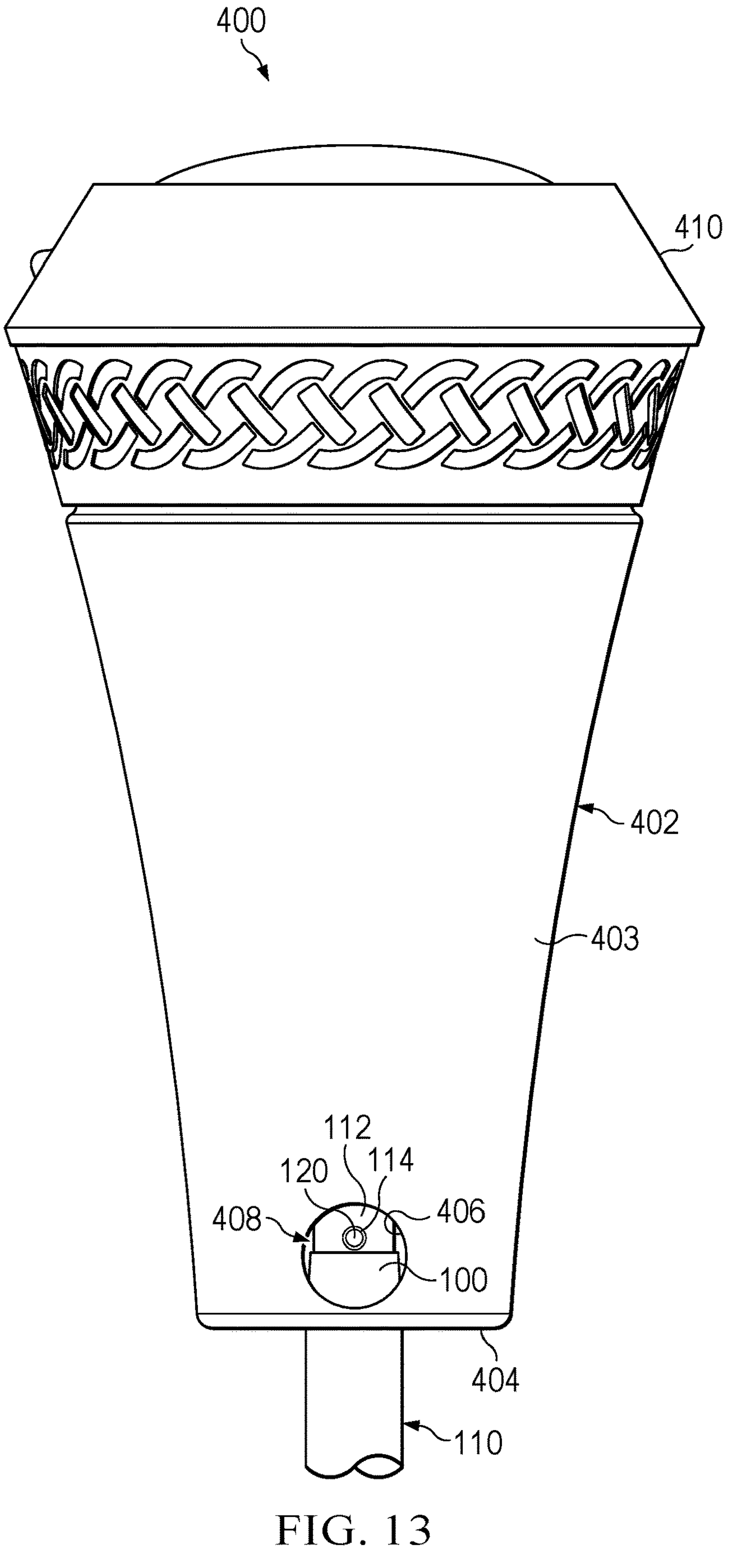
FIG. 13 is an elevation view of another torch assembly according to aspects of the present disclosure.

Referring now to FIG. 13, an elevation view of another torch assembly 400 according to aspects of the present disclosure is shown. The torch assembly 400 comprises a torch head assembly 402 formed of an outer wall 403. Here the outer wall 403 has a lower portion or floor 404 which may be affixed to the wall 403 (e.g., welded or adhered), or may be formed integrally with the wall 403. The floor 404 may be circular with the wall 403 circumscribing the floor where they meet. The torch assembly 400 has an inner cavity 408 defined at least partially by the wall 403 and floor 404. A protrusion portion 100 as described above, rises from the floor 404 and into the cavity 408. The protrusion portion 100 may be formed integrally with the floor 404 or formed as a separate component and then attached to the floor or other lower portion of the torch head assembly 402.

The spring tab 120 on the upper end 112 of the torch pole 110 may extend above the protrusion portion thereby locking the torch pole 110 and torch head assembly 402 together. The wall 403 may define an opening 406 to allow a user to depress or inwardly displace the spring tab 120 thereby allowing the torch pole 110 to be withdrawn from the protrusion portion 100 and the torch pole 110 and torch head assembly 402 to be separated.

Figure 14:
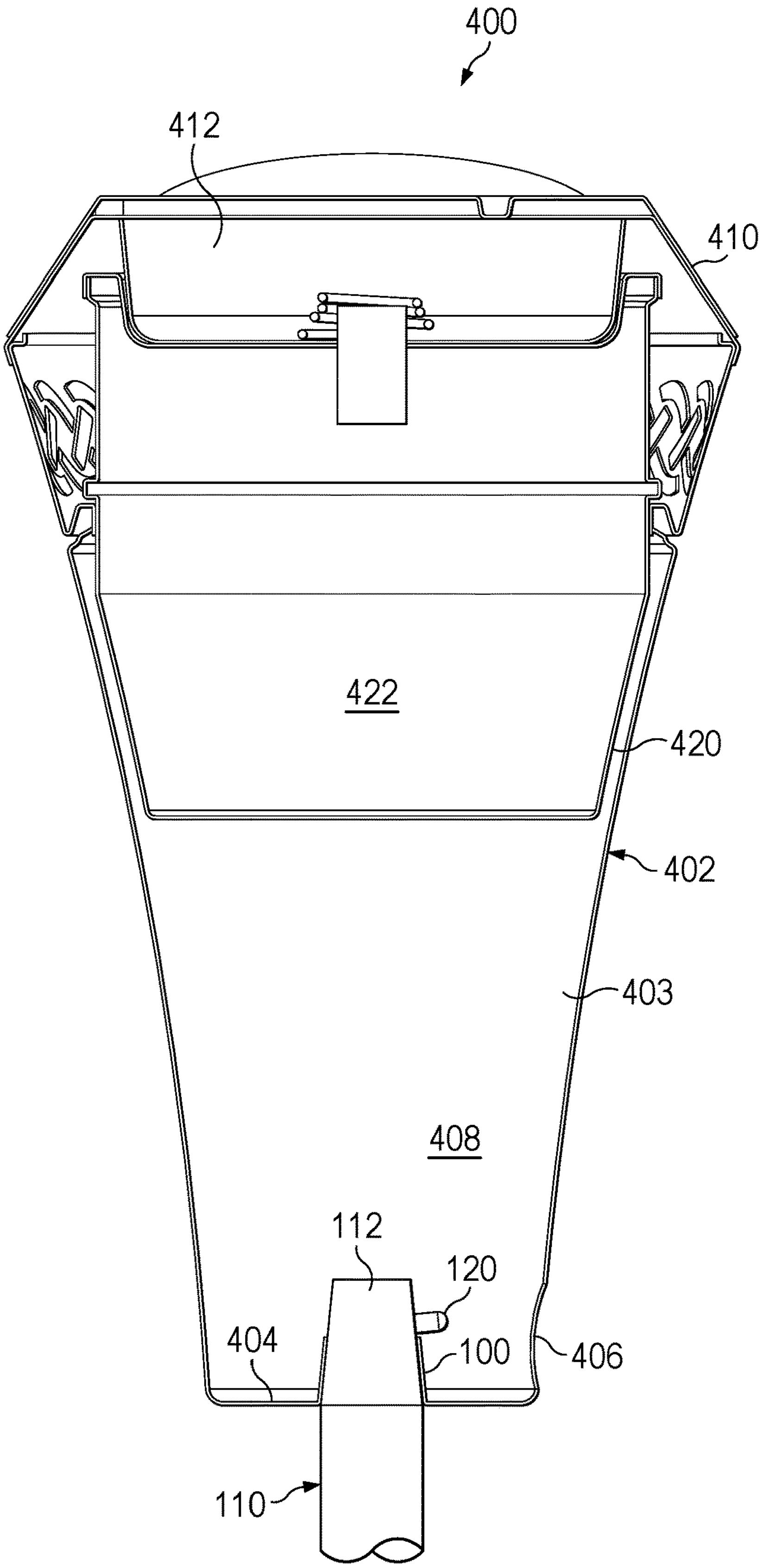
FIG. 14 is a cutaway view of the torch assembly of FIG. 13.

Referring now to FIG. 14, a cutaway view of the torch assembly of FIG. 13 is shown. The torch head assembly 402 may comprise a large flame bowl 412 that is selectively covered by a snuffer cap 410. In other embodiments, a non-large flame bowl, wick holder, or other torch head may be utilized. The interior cavity 408 of the torch head may contain a separate fuel reservoir 420 defining an interior fuel space 422 into which a wick may extend from the flame bowl 412. Use of a separate fuel reservoir 420 may free the wall 403 from certain design constraints as well as allowing the protrusion portion 100 to be fitted directly to the floor 404 of the torch head assembly 402 without use of a separate connector.

Figure 15:
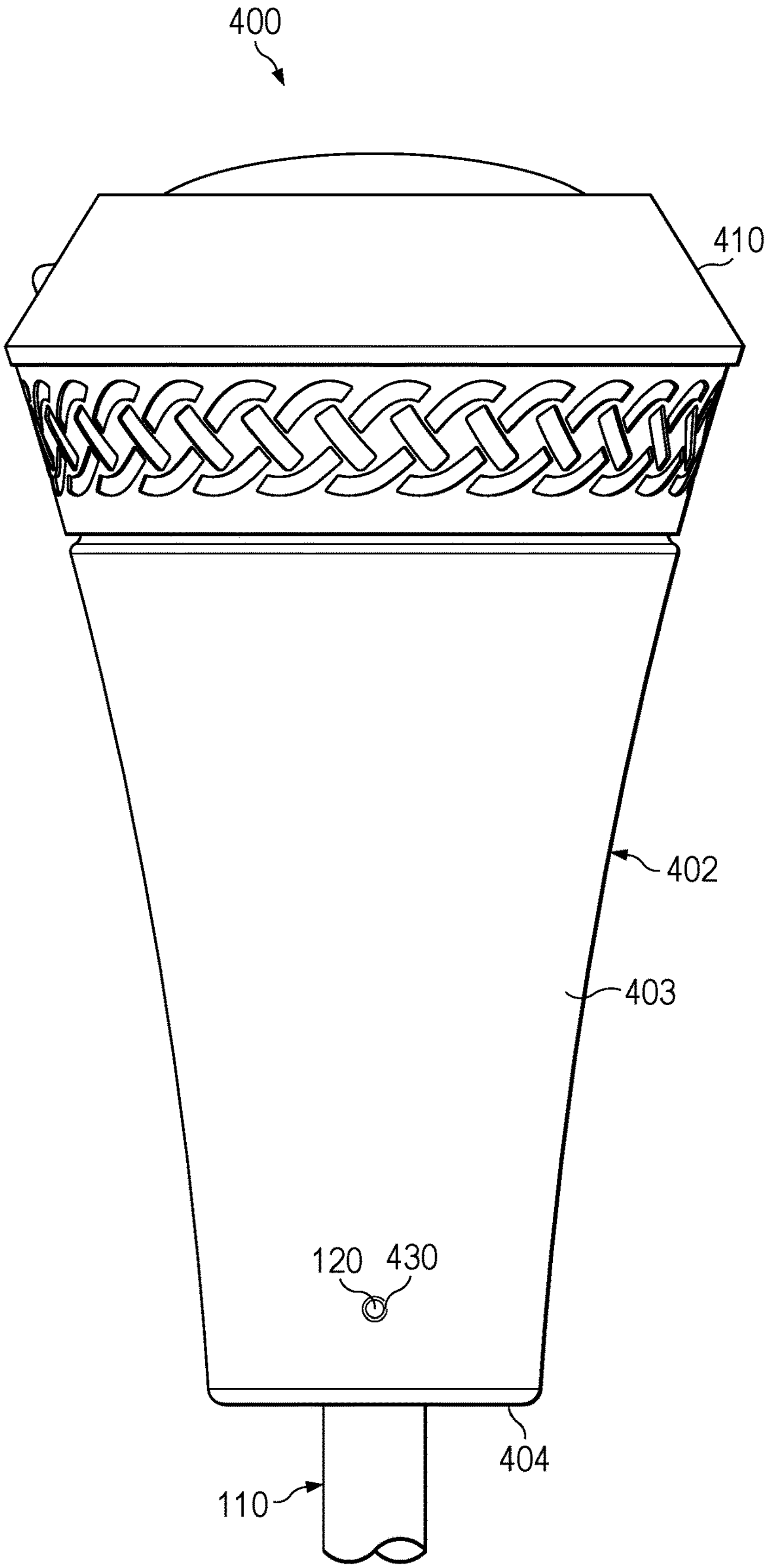
FIG. 15 is an elevation view of another torch assembly according to aspects of the present disclosure.

Referring now to FIG. 15, an elevation view of another torch assembly 400 according to aspects of the present disclosure is shown. The torch assembly 400 is substantially similar to identical to the torch assembly 300 except as described herein. The wall 403 of the torch head assembly 402 may define a smaller opening 430 allowing access to the spring tab 120 via a tool such as a screwdriver, a punch, or a purpose-built tool.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

The term "selective" or "selectively," unless otherwise indicated, is taken to mean that the operation or function is capable of being performed by the structure or device in reference, but the operation or function may not occur continuously or without interruption. Furthermore, a selective or selectively performed operation may be one that the user or operator of a device or method may choose whether or when to perform, but the function or operation is nevertheless fully operative on or within the relevant device, machine, or method and the same includes the necessary structure or components to perform such operation.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A torch and support pole combination comprising:
- a torch assembly;
- a wick extending above said torch assembly;
- a pole adapter affixed to said torch assembly, said pole adapter having a pole receiver having an inside frustoconical surface;
- a support pole having an upper frustoconical end for being received in said pole receiver; and
- a spring tab that is compressible during insertion of said support pole into said pole receiver, said spring tab extending when said pole is fully inserted, thereby creating a secure attachment of said torch assembly to said support pole.

2. The torch assembly and support pole combination of claim 1 wherein said pole adapter defines a pole adapter tray, said pole adapter affixed adjacent a bottom end of said torch head, said pole receiver of said pole adapter protruding above said pole adapter tray.

3. The torch assembly and support pole combination according of claim 1 wherein said frusto-conical portion has a taper having a slope of between and 3 and 7 degrees.

4. The torch assembly and support pole combination of claim 1 wherein:

said support pole defines a spring tab orifice; and said spring tab is an outwardly biased member that extends from said spring tab orifice.

5. The torch assembly and support pole combination of claim 1 wherein:

said spring tab is carried by said support pole, said spring tab compressible by said inside frustoconical surface of said pole receiver until said spring tab is inserted to a location above a top surface of said pole receiver.

6. A torch assembly comprising:

a torch head assembly having a flame bowl and a fuel reservoir;

a connector affixed to the bottom of the fuel reservoir, the connector defining an outer wall surrounding an interior cavity with an interior protrusion portion ending at an upper surface;

a pole with a spring tab extending therefrom when the pole is inserted into the interior protrusion portion above the upper surface; and an opening defined in the outer wall allowing depression of the spring tab inside the upper surface for removal of the pole from the torch head.

7. The torch assembly of claim 6, wherein the protrusion portion has a frustoconical interior.

8. The torch assembly of claim 7, wherein the pole comprises a frustoconical upper end.

9. The torch assembly of claim 8, wherein the spring tab extends from the frustoconical upper end of the pole.

10. A torch assembly comprising:

a torch head assembly having a flame bowl and an outer wall extending therebelow, the outer wall defining an interior cavity below the flame bowl;

a lower floor affixed to the outer wall opposite the flame bowl;

a protrusion portion rising from the lower floor into the interior cavity;

a pole fitting into the protrusion portion and having a spring tab that extends therefrom above the protrusion portion such that the pole is retained in the protrusion portion; and an opening defined in the outer wall allowing access to the spring tab;

wherein the protrusion portion is frustoconical and has a top surface that retains the spring tab when the spring tab is extended.

11. The torch assembly of claim 10, wherein the torch pole comprises a frustoconical upper end from which the spring tab extends.

12. The torch assembly of claim 11, wherein the torch head further comprises a fuel separate reservoir within the interior cavity.

* * * * *